United States Patent [19]
Holmes

[11] Patent Number: 6,070,946
[45] Date of Patent: Jun. 6, 2000

[54] DUAL WHEEL MOUNTING SYSTEM

[76] Inventor: James Holmes, 50 Mississauga Valley Blvd., Unit 913, Mississauga, Ontario, Canada, L5A 3S2

[21] Appl. No.: 09/069,454

[22] Filed: Apr. 29, 1998

[51] Int. Cl.[7] .................................................... B60B 11/00
[52] U.S. Cl. ...................................... 301/36.1; 301/35.62
[58] Field of Search ............................... 301/35.62, 36.1, 301/35.54, 35.57

[56] References Cited

U.S. PATENT DOCUMENTS

| | | | |
|---|---|---|---|
| D. 387,657 | 12/1997 | Holmes | D8/397 |
| 1,618,887 | 2/1927 | Putnam | 301/36.1 X |
| 2,017,114 | 10/1935 | Winchester | 151/38 |
| 2,150,111 | 3/1939 | Tatter | 29/159.1 |
| 2,533,707 | 12/1950 | Ash | 301/9.1 |
| 2,545,130 | 3/1951 | Ash | 301/63.1 |
| 2,844,409 | 7/1958 | Eksergian | 301/36.1 |
| 3,960,047 | 6/1976 | Liffick | 85/32 |
| 4,240,670 | 12/1980 | Zorn | 301/9.1 |
| 4,431,353 | 2/1984 | Capuano | 411/11 |
| 4,898,429 | 2/1990 | Plumer | 301/9.1 |
| 4,971,498 | 11/1990 | Goforthe | 411/134 |
| 5,597,279 | 1/1997 | Thomas et al. | 411/432 |

FOREIGN PATENT DOCUMENTS 2362837 7/1974 Germany ............................. 301/35.62

OTHER PUBLICATIONS

Aluminum Company of America, *Alcoa Aluminum Truck Wheel Service Manual and Operating Instructions*, Jan. 1994, pp. 11–18.

Motor Wheel, Page from *Motor Wheel Catalogue* entitled "Fasteners" No Date.

*Primary Examiner*—Russell D. Stormer
*Attorney, Agent, or Firm*—Bliss McGlynn, P.C.

[57] ABSTRACT

A combination of a dual wheel for a vehicle and clamping nuts for securing this wheel to studs on a wheel hub including inner and outer wheel assemblies having respectively inner and outer metal wheels. Each wheel includes a wheel disk having a number of stud-receiving holes of predetermined length. Each nut has a central, threaded passageway, wrenching surfaces formed on a head portion, and an integral, cylindrical skirt portion which has an outer diameter slightly less than the diameter of the holes in the outer metal wheel. A washer is rotatably mounted on each nut and has an outer side engaging an inner end of the head portion. During use of the nuts and the washers, a section of each skirt portion projects only into a respective one of the holes formed in the wheel disc of the outer wheel. The length of this section is equal to or less than the length of the holes in the outer wheel.

17 Claims, 3 Drawing Sheets

DUAL WHEEL MOUNTING SYSTEM

BACKGROUND OF THE INVENTION

This invention relates to dual wheels for vehicles such as trucks and fastening systems for securing these wheels in place.

It is well known that vehicle wheels can be mounted on a wheel hub having threaded studs projecting therefrom by means of a number of wheel nuts. This system can be used to mount not only single wheels, such as those found on automobiles, but also dual wheel assemblies generally used on large vehicles such as trucks. In a dual wheel arrangement having inner and outer metal wheels, each wheel has a wheel disc having a number of round, stud-receiving holes formed therein. Central sections of these discs are normally flat and are shaped so as to rest against one another when the two wheels are secured to a hub.

One known system for attaching both single wheels and dual wheels to a vehicle involves the use of cone lock nuts or two piece flange nuts to clamp the wheel in position. Use of these nuts is said to provide greater clamping force on the wheel (up to 150% greater than ball seat double cap nuts). Users of these nuts also claim that they provide a broader, more positive nut-wheel contact. These nuts comprise two pieces including a hexagonal body with wrenching surfaces formed around its circumferential perimeter and a washer portion rotatable on the nut body and having a conical outer surface. These nuts are generally used with hub-piloted wheel mounting systems. In use these cone nuts should be lubricated with a suitable oil in the area of the contact surfaces between the washer and the nut body.

However, even with the use of these cone nuts, problems are still being encountered with the mounting of truck wheels. These problems can result in a very dangerous situation if the nuts become sufficiently loose and eventually come off, permitting the wheel to come off the vehicle which may be moving at a high rate of speed. A number of attempts have been made to solve this problem but none of these proposed solutions have been entirely successful.

In recent years, hub piloted systems, which use the above described cone nuts, have been developed for mounting truck wheels. In such systems, the wheel hub is provided with hub pilot pads in order to position the wheel assembly or assemblies properly on the wheel hub. The hub-piloted system uses four, or in some cases five or six, pads strategically arranged on the hub to position the wheel horizontally and vertically. Once the wheel is in position, the cone nuts are then used by threading them onto the studs in order to clamp the wheel or wheels in place. Although such systems are more expensive than the alternative ball seat system, they claim to have increased clamping force and fewer, more simply maintained components.

However with hub-piloted systems, there is nothing to prevent the wheel or wheels from undergoing a circular (clocking) movement if there is a loss of torque applied to the side of the wheel by the cone nuts. This torque can be lost for a number of different reasons including contamination of the wheel mounting components by dirt or salt, worn hub pads, worn wheel mounting holes, over torqued nuts, bad installation procedures, and an impact on the wheel mounting caused by strong braking or engine torque.

Early U.S. Pat. No. 2,150,110 issued Mar. 7, 1939 to J. W. Tatter teaches a wheel structure which is mounted upon a hub by means of a number of bolts or studs that are mounted in the hub. Nuts are used to secure the wheel to the bolts and each nut has a normally concavo-convex spring washer swivelled onto an axially projecting flange formed on the nut. The flange has its end portion peened over so as to retain the washer in permanent association with the nut. According to the patent specification, the spring of the washers takes up any looseness of the nuts, thus helping to retain the wheel on the hub.

Much more recent U.S. Pat. No. 4,431,353 issued Feb. 14, 1984 to Russell Burdsall & Ward Corporation, describes a fastener assembly used to mount a vehicle wheel on a hub. This assembly includes a nut which is rotatable relative to a washer to enable the fastener assembly to be tightened without marring the wheel. The washer has an annular collar which is loosely connected with a nut by a retainer section which extends from one axial end portion of the nut. The washer also has an annular load transmitting and indicating section which extends radially outwardly from the collar and this section includes a spring section which flares radially and axially outwardly from the bearing section. When the fastener assembler is tightened with a predetermined preload, the spring section is flattened to provide a visual indication that the desired preload has been applied.

Early U.S. Pat. No. 2,017,114 issued Oct. 15, 1935 to Motorwheel Corporation describes a clamping nut assembly for mounting dual wheels on a vehicle hub. The dual wheels include a pair of side-by-side discs having holes in a central portion for receiving the wheel studs or securing bolts that project from an annular flange formed on the hub. Threaded onto the bolts are clamping nut assemblies each of which includes a tubular or skirt section and a polygonal head formed integrally with the skirt section. The outer surface of the tubular section snugly engages the inner surface of the openings formed in the two discs. Also, a cup-like washer encircles the tubular member and is secured in position against the head of the nut by a resilient ring.

One difficulty with the clamping nut assembly of the aforementioned U.S. patent is that the tubular or skirt portion of the nut is unduly and unnecessarily long, extending through the holes formed in both wheel discs. In addition to increasing the cost of the nut assembly, it can cause problems, including undue difficulty in installing the nut assembly through both holes in the wheel disks (for example, if one of the holes is slightly misaligned with the adjacent hole) and jamming of the nut assembly in the wheel disc holes. Jamming can occur, for example, if some movement should occur between the inner and outer wheel discs during use of the dual wheel assembly on a vehicle.

It is an object of the present invention to provide an easy to use and reliable combination of a dual wheel for a vehicle and means for securing this dual wheel to a vehicle wheel hub.

It is a further object of the present invention to provide a reliable dual wheel system for a vehicle, which system includes inner and outer wheel assemblies comprising inner and outer metal wheels and a number of clamping nuts, each including a washer rotatably mounted thereon. The nuts are provided with cylindrical skirt portions which extend only into the round, stud-receiving hole of the outer wheel. With this dual wheel system, the skirt portion of each nut prevents clocking movement of the wheel clamped by the nuts even if the torque on the wheel nuts is lost.

SUMMARY OF THE INVENTION

According to one aspect of the invention, a combination of a dual wheel for a vehicle and means for securing the dual wheel to a vehicle wheel hub comprises inner and outer wheel assemblies including respectively inner and outer metal wheels adapted for mounting on a wheel hub of a vehicle with the metal wheels arranged side-by-side. Each of the wheels includes a wheel disc having a number of round, cylindrical stud-receiving holes formed therein with each of the holes having a predetermined length. A number of clamping nuts each include a nut body having a central, threaded stud-receiving passage extending therethrough. Wrenching surfaces are formed on a head portion of the nut body and extend around its circumferential perimeter. An integral, cylindrical skirt portion forms an end section of the nut body and projects from one end of the head portion. This skirt portion has an outer diameter substantially equal to the diameter of the stud-receiving holes in the outer metal wheel. A washer is rotatably mounted on each clamping nut and has a flat inner side flat and an outer side with the outer side adapted for pressing engagement against an inner end of the head portion. During use of the clamping nuts and the respective washers to connect the two wheel assemblies to the wheel hub and threaded studs projecting therefrom, a section of each skirt portion projects only into a respective one of the stud-receiving holes formed in the wheel disc of the outer metal wheel. The length of this section of the skirt portion is equal to or less than the predetermined length of the holes in the outer metal wheel.

Preferably, the skirt portion of each clamping nut has a bevelled end to permit easier threading of the clamping nut into the respective stud-receiving hole.

According to another aspect of the invention, a dual wheel system for a vehicle includes inner and outer wheel assemblies having respectively inner and outer metal wheels adapted for mounting on a wheel hub of the vehicle. Each of the wheels includes a wheel disc having a number of round, cylindrical stud-receiving holes formed therein with each of these holes having a predetermined length. A number of clamping nuts each include a washer rotatably mounted thereon and a wide head portion having wrenching surfaces formed thereon. Each nut also has a narrower, cylindrical skirt portion projecting from one end of the head portion. This skirt portion has an outer diameter slightly smaller than to the diameter of each stud-receiving hole in the outer metal wheel. A central threaded passage extends through both the head portion and the skirt portion. Each washer has a ramped engagement surface facing the head portion and a flat inner side facing the wheel disk of the outer wheel. Each clamping nut has a tapered bearing face positioned to engage the ramped engagement surface of its respective washer. When the inner and outer wheel assemblies are mounted on the wheel hub by means of threaded wheel studs extending from the wheel hub and the clamping nuts, a section of each skirt portion projects only in a respective one of the stud-receiving holes formed in the wheel disc of the outer metal wheel and projects inwardly no further. The predetermined length of each hole in the outer metal wheel is equal to or greater than the length of this section of the skirt portion.

In one embodiment, each washer is permanently mounted on its respective clamping nut by a lip formed on the washer and a flange or ring on the skirt portion of the nut.

Further features and advantages will become apparent from the following detailed description of a preferred embodiment, taken in conjunction with the accompanying drawings.

DETAILED DESCRIPTION OF PREFERRED EMBODIMENTS

Figure 1:
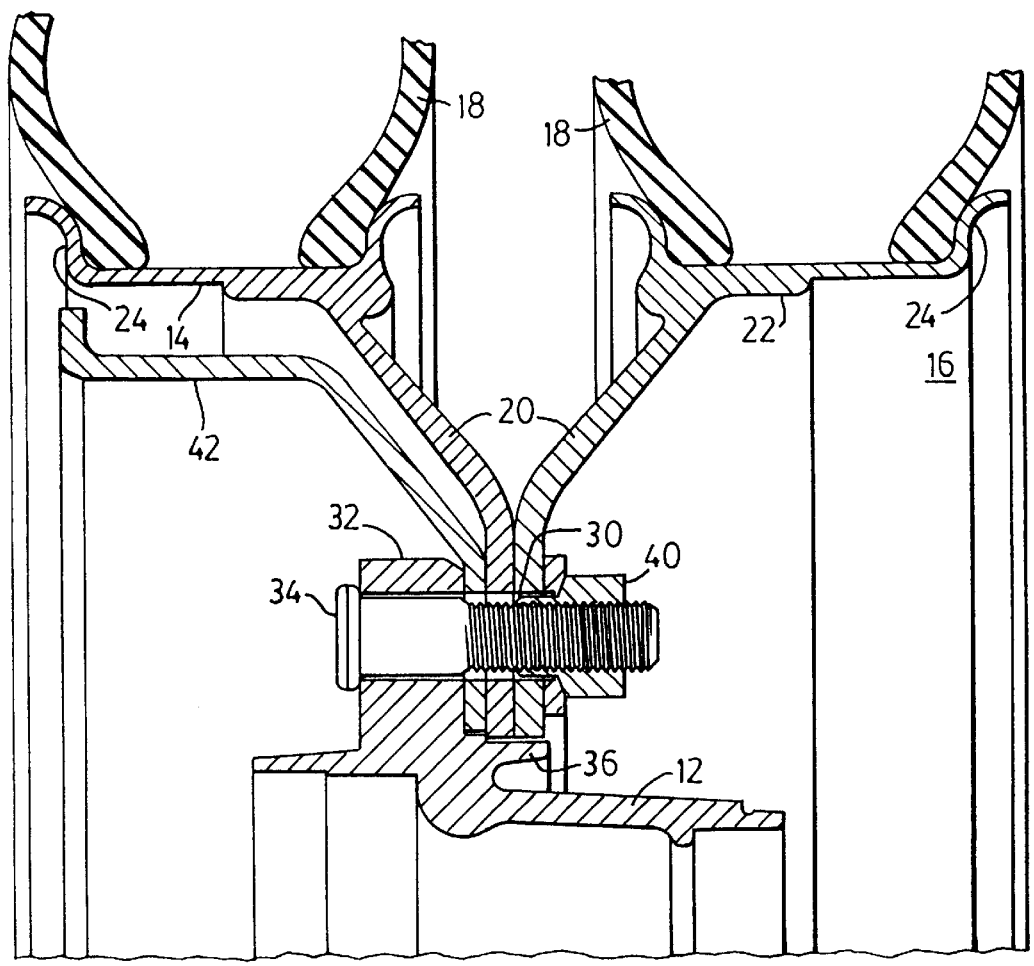
FIG. 1 is a cross-sectional view of a major portion of a dual wheel for a vehicle, this view illustrating how a clamping nut constructed in accordance with the invention secures the dual wheels to a wheel hub.

Shown in FIG. 1 is a combination of a dual wheel for a vehicle, such as a truck and means for securing this dual wheel to a vehicle wheel hub shown in part at 12. The dual wheel includes an inner wheel assembly 14 comprising an inner metal wheel and an outer wheel assembly 16 comprising an outer metal wheel. Both these wheels are adapted for mounting on the wheel hub 12 of the vehicle with the metal wheels arranged side-by-side. The wheel hub 12 is constructed as a hub-piloted system in a manner known per se. On each of the metal wheels is mounted a rubber tire 18. Each of the illustrated metal wheels includes a wheel disc 20 having an annular flange 22 extending about its outer periphery. Tire receiving rim sections 24 are attached to the flanges. Each pneumatic tire 18 is mounted on to the rim section in the usual manner. A flat, central portion of each disc 20 has a number of round, cylindrical stud-receiving holes 30 formed therein and these holes have a predetermined length L indicated in FIG. 2.

The hub 12 for these dual wheels has a flange portion 32 to which the wheel discs are attached by means of a number of threaded studs or connecting bolts 34. The hub includes four or more integral pilot pads 36 for proper positioning and centering of the wheel discs 20 on the hub. The use of such pilot pads for mounting truck wheels is well known in the trucking industry.

Figure 7:
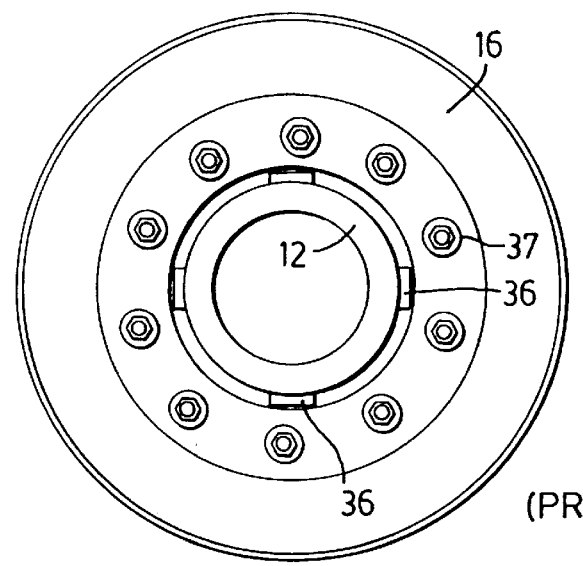
FIG. 7 is a schematic side view of a known prior art wheel (central portion only) mounted on a standard hub provided with pilot pads.

FIG. 7 is a schematic illustration of the central portion of a wheel assembly 16 mounted on a known type of wheel hub 12 having four integral pilot pads 36. To mount the wheel, it is placed square on the hub and as far back on the pilot pads 36 as possible. The standard nuts 37, ten of which are shown, are then installed and tightened.

Figure 2:
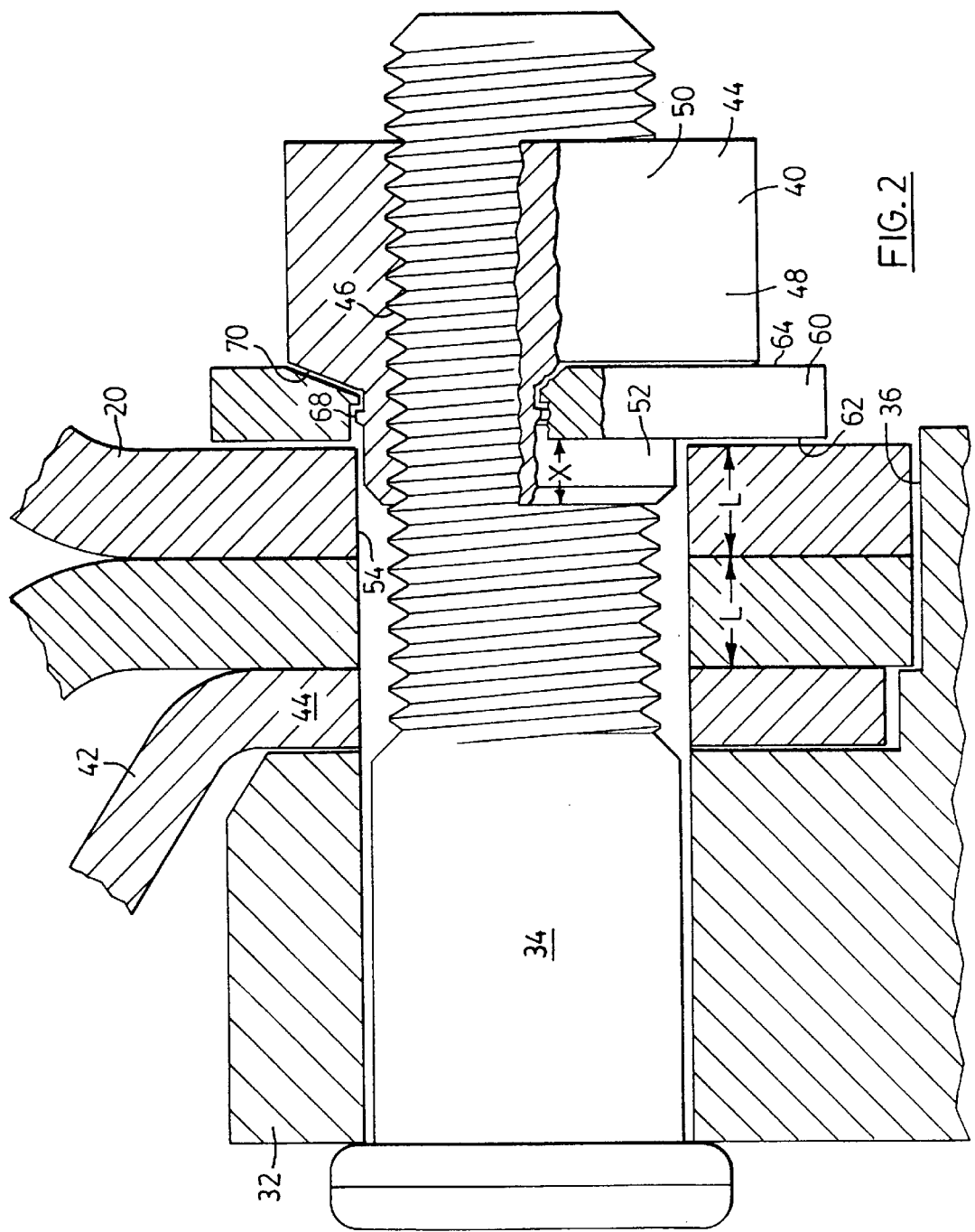
FIG. 2 is another cross-sectional view on an enlarged scale showing a complete wheel stud and a clamping nut (partly cut away) and the manner in which they connect a dual wheel to a hub.

A number of clamping nuts 40 are used to connect the wheel assemblies to the hub 12. Only one of these clamping nuts and its respective stud is shown in FIGS. 1 and 2. It will be appreciated that the total number of these clamping nuts and the studs can vary depending upon the size and construction of the wheel and other factors. For example, there could be five, six, eight or ten studs 34 along with a similar number of nuts 40.

Also, as shown in FIGS. 1 and 2, the studs and nuts can also be used to secure in place a standard brake drum 42 having a flat central portion 44 with holes formed therein for the studs.

Figure 4:
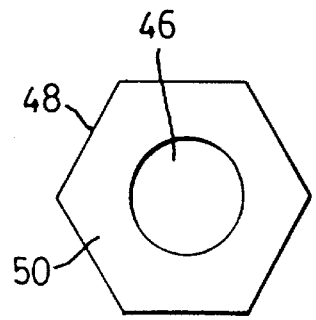
FIG. 4 is a top view of the nut of FIG. 3.

Each clamping nut includes a nut body 44 having a central, threaded stud receiving passage 46 extending completely therethrough. Wrenching surfaces 48 are formed on a head portion 50 of the nut body and extend around its circumferential perimeter. Preferably there are six of these flat wrenching surfaces formed on the head portion so that the circumferential perimeter is hexagonal as shown in FIG. 4. Thus, the nuts of the present invention can be tightened and torqued using standard wrenches and power tools. The nut body also includes an integral, cylindrical skirt portion 52 forming an end section of the nut body and projecting from one end of the head portion 50. This skirt portion 52 has an outer diameter slightly less than the diameter of the stud-receiving holes 54 in the outer metal wheel to enable the skirt portion to be readily threaded into the hole 54. In a preferred version of the clamping nut, the clearance between the skirt portion 52 and the hole 54 is 1/1000th of an inch but a manufacturing tolerance of up to 4/1000ths of an inch is acceptable for the skirt portion of the nut. Also, in order to make the use of the clamping nut even easier, the preferred skirt portion 52 has a bevelled end 56 which helps to guide the end of the nut into the hole as the nut is threaded onto the stud. In a preferred embodiment, the angle of the bevel is 20 degrees relative to a central axis of the nut.

A generally flat washer or flange 60 is rotatably mounted on each clamping nut and this washer has a flat inner side 62 that faces the wheel disk and an outer side 64 with the outer side adapted for pressing engagement against an inner end of the head portion 50. In the preferred embodiment of the clamping nut, the washer 60 is secured to the nut so that the washer cannot separate from the nut even when the clamping nut is not threaded onto a wheel connecting stud 34. To permit this permanent connection, the preferred washer 60 is formed with an annular lip 66 (see FIG. 6) that projects radially inwardly into a circular opening 68 formed by the washer. After the washer has been placed in position over the skirt portion of its respective nut, another lip 68 is formed on the skirt portion in order to secure the washer on the nut. In other words, the outer diameter of the lip 68 exceeds the inner diameter of the lip 66. In forming the lip 68, care must be taken not to interfere with the free rotation of the washer on the nut. It will be understood that the lip 68 need not be a continuous lip but could comprise a few lip sections or a number of lip sections.

In an alternate embodiment of the nut, instead of the integral lip 68, a separate metal or plastic ring can be used to form the annular lip or flange on the skirt. This ring is pressed over the skirt after the washer is in place and there is a pressed or forced fit between the ring and the skirt portion so that the ring is held firmly in place.

Figure 3:
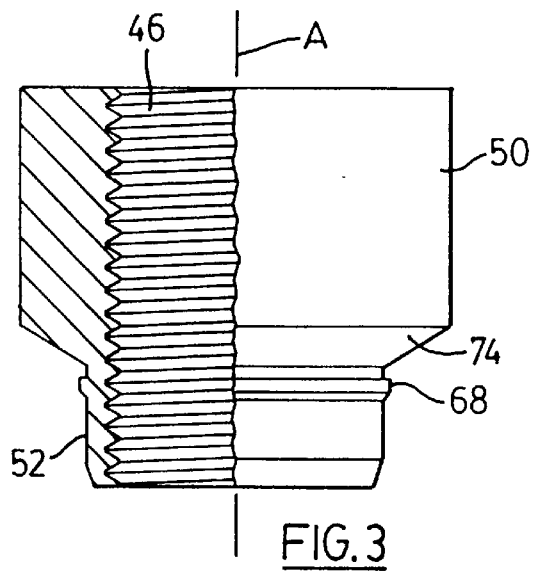
FIG. 3 is a side view of a clamping nut of the invention, without a washer attached, with the left side of the nut being shown in axial cross-section and the exterior of the nut being shown on the right side.
Figure 6:
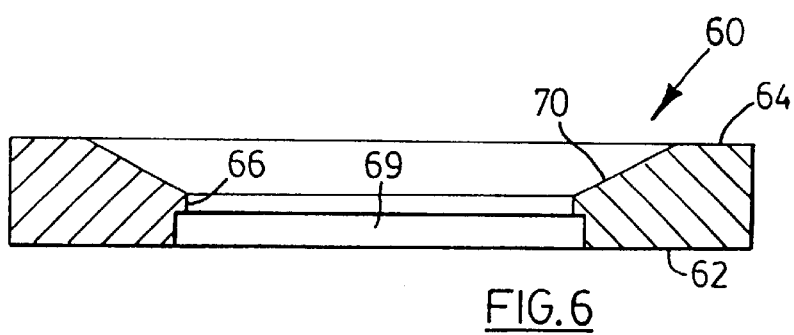
FIG. 6 is a cross-sectional view of a preferred washer for use with the nut of FIGS. 3 to 5, this view being taken along a plane extending through a center axis of the washer.

The construction of the preferred washer 60 will now be described with reference to FIG. 6. The inner side 62 is flat and this is the side that bears against the side of the outer wheel disc while the outer side of the washer forms a ramped engagement surface at 70. In a particularly preferred embodiment, the outer side is ramped at an angle of about 30 degrees relative to the plane of the flat inner side 62. Each clamping nut has a tapered bearing face 74 adapted to engage the ramped engagement surface 70 of the washer. Because of these sloping engagement surfaces, the washer 60 is always centered with or coaxial with the clamping nut and this results in a very uniform distribution of the clamping force from the nut through the washer. In order to match the slope of the preferred washer, the bearing face 74 tapers at an angle of about 30 degrees relative to a radial plane extending perpendicular to a central axis (indicated at A in FIG. 3) of the stud-receiving passage 46.

As shown in FIGS. 1 and 2, during use of the clamping nuts 40 and their respective washers 60 to connect the two wheel assemblies to the wheel hub and the threaded studs projecting from the hub, a section of each skirt portion 52 projects only into a respective one of the stud receiving holes formed in the wheel disc 20 of the outer metal wheel and projects inwardly no further. This follows from the fact that the length of the section indicated by the distance X in FIG. 2 is equal to or less than the predetermined length L of the holes in the outer metal wheel. The short length of the skirt results in the clamping nut being relatively easy to instal on the stud or connecting bolt and furthermore it is relatively easy to remove from the stud, when required. Thus, any misalignment between the adjacent stud-receiving holes in the inner and outer wheels will not make it more difficult to install the clamping nut nor does it make it difficult to remove the nut when the wheel must be removed. In addition, it will be appreciated that the provision of this skirt on the clamping nut has important advantages from the standpoint of preventing the nut from inadvertently coming off of the wheel stud. Because the skirt portion extends into the stud hole of the outer wheel, the skirt prevents clocking movement of the wheel on the nut. It is this clocking movement that can cause ordinary wheel nuts to come off quickly once the required torque on the nut is lost. Of course, if all of the nuts for the wheel come off, the wheel itself will come of f the hub creating a very dangerous situation. Furthermore, with the clamping nut of the invention, even if the required torque on the nut is lost for some reason, the clamping nut should remain on the stud a sufficient length of time to allow the operator to fix the problem before the wheel can come off.

For most truck wheels, the skirt portion 52 of the preferred clamping nut has an outer diameter of about 1.03 inch for a major portion of its length, not including the bevelled end 56. In one particular embodiment of the nut, this outer diameter measures 1.033 inch while the other diameter of the annular lip formed on the skirt is 1.046 inch.

Figure 5:
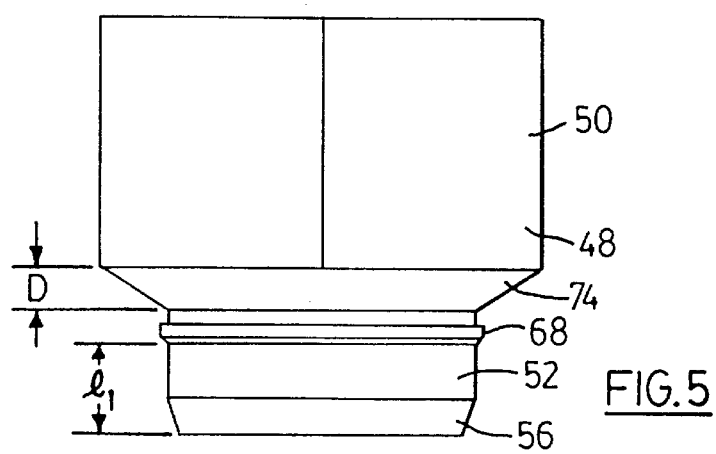
FIG. 5 is a complete side view of the nut without an attached washer.

In a preferred version of the clamping nut, the thread in passage 46 is right hand thread. The width of the hexagonal head portion measured perpendicularly between opposite flat sides is 33 or 38 mm while the height of these flat sides is 20 mm. The longitudinal distance from the lip 68 to the end of the skirt portion is preferably 8 mm. The depth of the tapered bearing face 74 in this preferred embodiment measures 4 mm, this depth being indicated by D in FIG. 5.

Turning now to the size of the washer 60 used in the aforementioned preferred embodiment, the width of the opening 69 is 1.05 inch while the inner diameter of the lip 66 is 1.044 inch. The external diameter of the washer is 48 mm while the depth of the washer is 7 mm. The distance of the lip 66 from the inner side 62 is 2 mm while the depth of the ramp surface 70 as measured perpendicular to the flat sides of the washer is 4 mm.

It will be readily apparent to those skilled in this art that various modifications and changes can be made to the described combination of a dual wheel and means for securing same to a vehicle hub without departing from the spirit and scope of this invention. Accordingly, all such modifications and changes as fall within the scope of the appended claims are intended to be part of this invention.

I claim:

1. A combination of a dual wheel for a vehicle and means for securing said dual wheel to a vehicle wheel hub, said combination comprising:

inner and outer wheel assemblies including respectively inner and outer metal wheels adapted for mounting on a wheel hub of a vehicle with the metal wheels arranged side-by-side, each of said wheels including a wheel disc having inner and outer sides and a number of round, cylindrical stud-receiving holes formed therein with each of said holes having a predetermined length extending from said inner side to said outer side;

a number of clamping nuts, each including a nut body having a central, threaded, stud-receiving passage extending therethrough, said nut body including a head portion and an integral, cylindrical skirt portion, wrenching surfaces formed on said head portion and extending around its circumferential perimeter, said skirt portion projecting from an inner end of the head portion, said skirt portion having an outer diameter slightly smaller than the diameter of the stud-receiving holes in the outer metal wheel, a washer rotatably mounted on each clamping nut and having a flat inner side and an outer side adapted for pressing engagement against said inner end of said head portion, wherein, during use of said clamping nuts and their respective washers to connect the two wheel assemblies to said wheel hub and threaded studs projecting therefrom, each skirt portion projects only into a respective one of said stud-receiving holes formed in the wheel disk of the outer metal wheel and projects inwardly no further, the length of a section of the skirt portion projecting into the stud-receiving hole being equal to or less than the predetermined length of the holes in the outer metal wheel.

2. The combination of claim 1 wherein the skirt portion of each clamping nut has a bevelled end to permit easy threading of the clamping nut onto its respective stud.

3. The combination of claim 2 wherein each washer is secured to its respective clamping nut so that the washer cannot separate from its clamping nut even when the clamping nut is not threaded onto a wheel connecting stud.

4. The combination of claim 3 wherein there are six wrenching surfaces formed on said head portion so that said circumferential perimeter is hexagonal.

5. The combination of claim 1 wherein said outer side of each washer forms a ramped engagement surface and each clamping nut has a tapered bearing face adapted to engage the ramped engagement surface of its respective washer.

6. The combination of claim 1 including said wheel hub with wheel connecting studs mounted thereon, said inner and outer wheel assemblies being firmly mounted on said wheel hub by means of said studs, said clamping nuts threaded onto said studs, and said washers.

7. The combination of claim 6 wherein said wheel hub is a pilot-type hub provided with hub pilot pads in order to position and center said inner and outer wheel assemblies properly on said wheel hub.

8. The combination of claim 1 wherein the skirt portion of each clamping nut has an outer diameter of about 1.03 inches for a major portion of its length, not including said bevelled end.

9. The combination of claim 3 wherein each washer is formed with an annular lip that projects radially inwardly into a circular opening formed by the washer, and an annular flange is provided on the skirt portion of each clamping nut in order to secure its respective washer on said clamping nut by engagement between the lip and the flange.

10. The combination of claim 5 wherein said outer side is ramped at an angle of about 30 degrees relative to said flat inner side and said tapered bearing face of each clamping nut tapers at an angle of about 30 degrees relative to a radial plane extending perpendicular to a central axis of said stud-receiving passage.

11. A dual wheel system for a vehicle comprising:

inner and outer wheel assemblies including respectively inner and outer metal wheels adapted for mounting on a wheel hub of said vehicle, each of said wheels including a wheel disc having inner and outer sides and having a number of round, cylindrical stud-receiving holes formed therein with each of said holes having a predetermined length extending from said inner side to said outer side; and a number of clamping nuts each including a washer rotatably mounted thereon, each nut including a wide head portion having wrenching surfaces formed thereon and inner and outer ends and a narrower cylindrical skirt portion projecting from said inner end of said head portion, said skirt portion having an outer diameter slightly smaller than the diameter of each stud-receiving hole in the outer metal wheel, a central threaded passage extending through both said head portion and said skirt portion, each washer having a ramped engagement surface facing said head portion and a flat inner side facing the wheel disc of the outer metal wheel, and each clamping nut having a tapered bearing face positioned to engage said ramped engagement surface of its respective washer;

wherein, when said inner and outer wheel assemblies are mounted on said wheel hub by means of threaded wheel studs extending from said wheel hub and said clamping nuts, each skirt portion projects only into a respective one of the stud-receiving holes formed in the wheel disk of the outer metal wheel and projects inwardly no further, said predetermined length of each hole in the outer metal wheel being equal to or greater than the length of a section of the skirt portion projecting into the stud-receiving hole.

12. A dual wheel system according to claim 11 wherein the skirt portion of each clamping nut has a bevelled end for easy threading of the nut into its respective stud-receiving hole.

13. A dual wheel system according to claim 12 wherein each washer is permanently mounted on its respective clamping nut by a lip formed on the washer and a flange provided on the skirt portion of the clamping nut.

14. A dual wheel system according to claim 12 including a wheel hub with a number of said threaded wheel studs, said inner and outer wheel assemblies being firmly mounted on said wheel hub using said studs and said clamping nuts threaded onto said studs.

15. A dual wheel system according to claim 14 wherein said wheel hub is a pilot-type hub provided with hub pilot pads in order to position and center said inner and outer wheel assemblies properly.

16. A dual wheel system according to claim 15 wherein the skirt portion of each clamping nut has an outer diameter of about 1.03 inches for a major portion of its length, not including said bevelled end.

17. A dual wheel system according to claim 12 wherein both said ramped engagement surface and said tapered bearing face extend at an angle of about 30 degrees relative to a radial plane that is perpendicular to a central axis of said threaded passage.

* * * * *

(12) EX PARTE REEXAMINATION CERTIFICATE (8790th)
United States Patent
Holmes

(10) Number: US 6,070,946 C1
(45) Certificate Issued: Jan. 10, 2012

(54) DUAL WHEEL MOUNTING SYSTEM

(76) Inventor: James Holmes, Mississauga (CA)

Reexamination Request:
No. 90/011,389, Jan. 25, 2011

Reexamination Certificate for:
Patent No.: 6,070,946
Issued: Jun. 6, 2000
Appl. No.: 09/069,454
Filed: Apr. 29, 1998

(51) Int. Cl.
*B60B 11/00* (2006.01)

(52) U.S. Cl. .................. 301/36.1; 301/35.627
(58) Field of Classification Search ............ 301/36, 301/36.1, 35.628
See application file for complete search history.

(56) References Cited

To view the complete listing of prior art documents cited during the proceeding for Reexamination Control Number 90/011,389, please refer to the USPTO's public Patent Application Information Retrieval (PAIR) system under the Display References tab.

*Primary Examiner* — Matthew C. Graham

(57) ABSTRACT

A combination of a dual wheel for a vehicle and clamping nuts for securing this wheel to studs on a wheel hub including inner and outer wheel assemblies having respectively inner and outer metal wheels. Each wheel includes a wheel disk having a number of stud-receiving holes of predetermined length. Each nut has a central, threaded passageway, wrenching surfaces formed on a head portion, and an integral, cylindrical skirt portion which has an outer diameter slightly less than the diameter of the holes in the outer metal wheel. A washer is rotatably mounted on each nut and has an outer side engaging an inner end of the head portion. During use of the nuts and the washers, a section of each skirt portion projects only into a respective one of the holes formed in the wheel disc of the outer wheel. The length of this section is equal to or less than the length of the holes in the outer wheel.

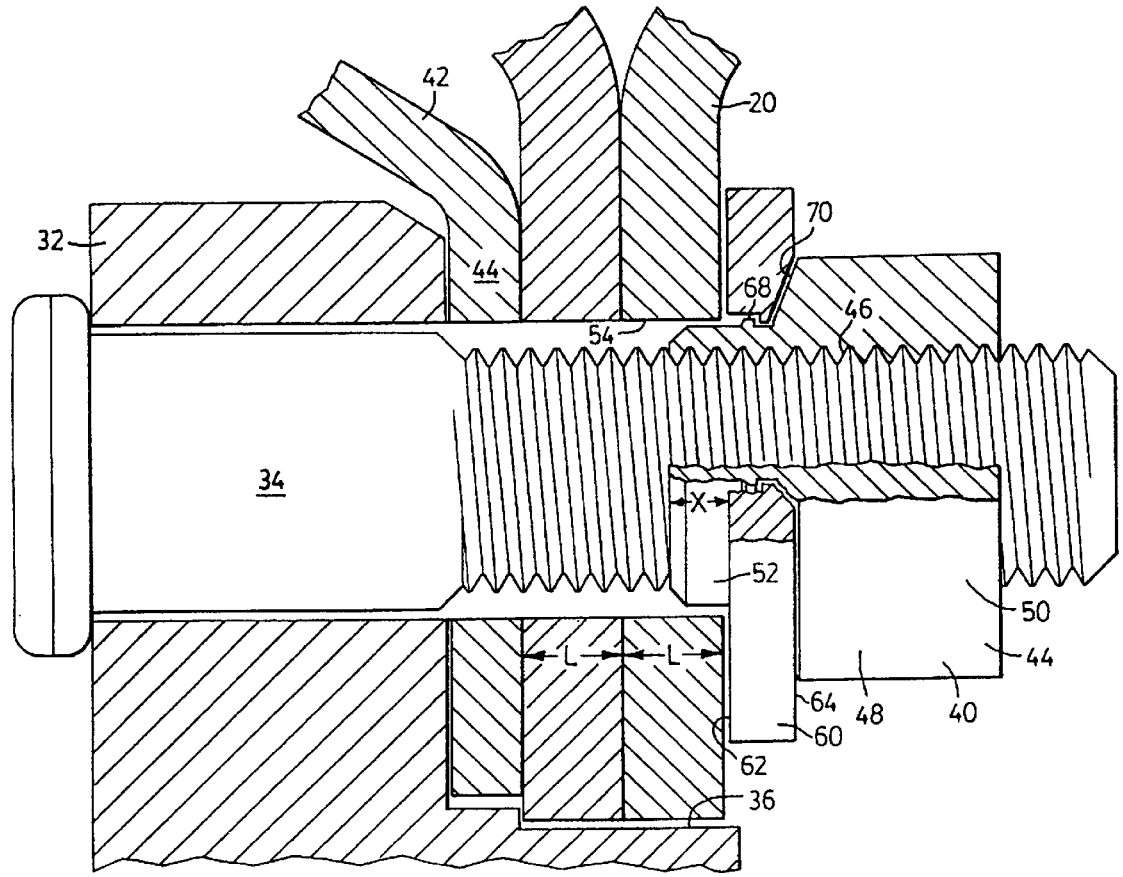

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-17 is confirmed.

New claims 18-20 are added and determined to be patentable.

*18. A combination of a dual wheel for a vehicle and means for securing said dual wheel to a vehicle wheel hub, said combination comprising:*

*inner and outer vehicle wheel assemblies including respective inner and outer metal wheels adapted for mounting on a pilot-type wheel hub provided with hub pilot pads for the purpose of positioning and centering said inner and outer wheel assemblies wherein said metal wheels are arranged side-by-side, each of said wheels including a wheel disk having inner and outer sides and a number of cylindrical stud-receiving holes formed therein with each of said holes having a predetermined length measured between the inner and outer sides of said wheel disks;*

*a plurality of clamping nuts each including a nut body having a central threaded stud-receiving package extending therethrough, said nut body further including a head portion and an integral cylindrical skirt portion, wrenching surfaces formed on said head portion and extending around the circumferential perimeter thereof, said skirt portion projecting from an inner end of the head portion, said skirt portion having an outer diameter slightly smaller than the diameter of the stud receiving holes in the outer metal wheel;*

*a washer rotatably mounted on each clamping nut and having a flat inner side and an outer side adapted for pressing engagement against inner end of said head portion;*

*wherein, during use of said clamping nuts and their respective washers to connect the two wheel assemblies to said wheel hub and threaded studs projecting therefrom, each skirt portion projects only into a respective one of said stud receiving holes formed in the wheel disk of the outer metal wheel and projects inwardly no further, the length of a section of the skirt portion projecting into the stud receiving hole being equal to or less than the predetermined length of the holes in the outer metal wheel.*

*19. The combination of claim 18 wherein the skirt portion of each clamping nut has a beveled end to permit easy threading of the clamping nut onto its respective stud.*

*20. The combination of claim 19 wherein each washer is secured to its respective clamping nut so that the washer cannot separate from its clamping nut when the clamping nut is unattached.*

\* \* \* \* \*